United States Patent [19]

Tsai et al.

[11] Patent Number: 5,065,229

[45] Date of Patent: Nov. 12, 1991

[54] COMPRESSION METHOD AND APPARATUS FOR SINGLE-SENSOR COLOR IMAGING SYSTEMS

[75] Inventors: Yusheng T. Tsai; Kenneth A. Parulski; Majid Rabbani, all of Rochester, N.Y.

[73] Assignee: Eastman Kodak Company, Rochester, N.Y.

[21] Appl. No.: 588,775

[22] Filed: Sep. 27, 1990

Related U.S. Application Data

[62] Division of Ser. No. 384,353, Jul. 24, 1989.

[51] Int. Cl.$^5$ .............. H04N 9/64; H04N 11/04; H04N 7/12
[52] U.S. Cl. ..................... 358/21 R; 358/13; 358/133
[58] Field of Search ................. 358/21 R, 13, 133, 12

[56] References Cited

U.S. PATENT DOCUMENTS

| | | | |
|---|---|---|---|
| 4,745,462 | 5/1988 | Dischert et al. | 358/21 R |
| 4,876,590 | 10/1989 | Parulski | 358/44 |
| 4,896,207 | 1/1990 | Parulski | 358/44 |

Primary Examiner—Howard W. Britton
Assistant Examiner—Wendy R. Greening
Attorney, Agent, or Firm—Edward Dugas

[57] ABSTRACT

The method of the present invention operates upon the imaging signals from a color filter array image sensor to compress the image signals prior to color interpolation by separating the signals into three color planes. Missing green pixels are recovered through interpolation methods, either by bilinear or other techniques, in order to form color ratio signals long $B/G_{missing}$ and log $R/G_{missing}$ which allows for proper interpolation after decompression without color artifacts. Upon playback or reception, an inverse compression is applied and missing green, red and blue pixels are interpolated to provide three full planes of color image data.

15 Claims, 9 Drawing Sheets

COMPRESSION METHOD AND APPARATUS FOR SINGLE-SENSOR COLOR IMAGING SYSTEMS

This is a division, of application Ser. No. 384,353 filed July 24, 1989.

TECHNICAL FIELD

The present invention is directed to a method and an apparatus for processing image data from a single chip color image sensor to facilitate visually lossless data compression prior to storage or transmission.

DESCRIPTION OF THE PRIOR ART

To provide color images, an electronic camera may use a color beamsplitter and three image sensors, one each for red, green, and blue. To reduce the size and cost of the camera, a single sensor, overlaid with a color filter pattern, can be used to obtain color images, provided that the sensor output signal is processed in an appropriate manner in order to demultiplex and interpolate the three color signals.

Many color filter patterns are possible. Some options are described in the paper entitled "Color Filters and Processing Alternatives for One-Chip Cameras" by K. A. Parulski published in the *IEEE Transactions on Electronic Devices*, Volume ED-32, Number 8, August 1985, Pages 1381–1389.

Single chip color sensors may be used in electronic still cameras as well as video cameras and camcorders. In order to store high quality, low noise color images, an electronic camera should preferrably use digital storage or recording rather than analog storage. U.S. Pat. No. 4,131,919, "Electronic Still Camera" by Gareth A. Lloyd and Steven J. Sasson, assigned to Eastman Kodak Co. the assignee of the present invention, describes an electronic still camera which uses digital magnetic tape recording. The digital storage may also be accomplished by using a solid-state memory card. In all cases, the number of digital images which can be stored can be increased, and the recording time per picture can be reduced, if digital data compression is used to reduce the amount of data required to represent the images.

Conventional data compression methods for images from color cameras use the demultiplexed and interpolated three-color data instead of the directly digitized sensor output signal. One example of such an approach is shown in U.S. Pat. No. 4,797,729 entitled "Systems for Incorporating an Error-Tolerant Picture Compression Algorithm" by Y. T. Tsai, which patent is also assigned to Eastman Kodak Co.

The color interpolation process will triple the single "plane" of data from the digitized sensor output to three planes of data, one each for the red, green, and blue color information. Each color plane has the same number of pixels as the sensor. Image compression can be done directly on these three planes, or more efficiently, on the YIQ color space which is derived from the RGB data. After compression, the total amount of data must be much smaller than the "original" digitized sensor output data, or the compression will have served no purpose. Inverse compression will reconstruct the color image in the corresponding color space which can then be further processed, displayed, or printed.

Since the color interpolation itself does not increase the information entropy of the original image, but instead increases the amount of redundant data, conventional compression methods may be less efficient than directly compressing the digitized sensor output signal. Considering the implementation cost, system complexity, and computation time needed, the approach of compressing the demultiplexed and interpolated data is a poor choice.

Attention is thus directed to how the compression might be efficiently accomplished directly on the sensor output data. Since the CFA introduces a color patterning onto the sensor output data, the data correlation has many discontinuities of its distribution which may reduce the compression efficiency. Treating the sensor output data as a single luminance image data record makes uniform saturated colors appear as a very busy image which requires a high bit rate to prevent a visual loss in quality when decompressed. Furthermore, color image data which has been sparsely sampled through a color filter array is very sensitive to errors. A single error in the data may cause a complex error pattern, depending on the location of the error, the pattern of the color filter array, and the color interpolation process. Therefore, straight-forward data compression applied to the color sensor output will not be efficient, even if the digitized pixel values are divided into different data records, according to the color filters of the pixels, and separately compressed, as described for example in U.S. Pat. No. 4,758,883 "Electronic Picture Camera with Reduced Memory Capacity" by Kawahara et al. This is because even a slight error in one of the color channels can cause a significant colored "artifact" in the nearby region of the image, as a result of the interpolation process which follows the decompression process.

A new method for compressing one-chip color images, which uses the sensor output data more judiciously, and introduces the least complexity in a system implementation, is thus desirable.

SUMMARY OF THE INVENTION

The present invention provides a method and a real-time system architecture for compressing color images that are obtained from a single-chip CCD imager of the type which uses a color filter array (CFA). The first step of the method is to separate the digitized color sensor output into three data records, one (green) data records for luminance and two (red and blue) data records for color. The second step is to convert the red and blue data records to color ratio data records which are a function of both the red or blue pixel values and the interpolated luminance (green) signal value at the spatial locations corresponding to the red or blue pixels. The third step is to transform the luminance (green) data record from a linear space metric (that is, a digital quantization characteristic where equal code value changes correspond to equal luminance changes in the image, for all code values) to a more perceptually uniform metric (That is, a digital quantization characteristic where equal code value changes correspond to equal changes in the perceived lightness of the image, thereby taking into account the non-linearity of the human visual system.) for example, the "L*" metric. The *Television and Engineering Handbook* by K. B. Benson Editor, published by McGraw Hill, pages 2.38–2.40 sets forth definitions for uniform color spaces and, more particularly, the L* space. The fourth step is to individually compress the luminance (green) data records and the two color ratio data records (R/G, B/G) to reduce the average bit rate. The compressed image data may then be recorded or transmitted. In the playback stage or at the receiving station, an inverse compression is applied. After decompression, the red, green, and blue data records are recovered and interpolated to obtain the three full color planes of digital image data.

This method has the advantage of processing less data than conventional methods, in less time using less storage, and of providing more efficient compression.

From the foregoing it can be seen that it is a primary object of the present invention to perform image compression on color sensor output data by first rearranging the data into a plurality of data records in such a way as to reduce the discontinuities in the data stream.

It is another object of the present invention to process color image data prior to compression by rearranging and processing the sensor output data in such a way that compression on the chrominance information is done on color ratio signals, and compression on the luminance is done using perceptually uniform quantization characteristic.

It is yet a further object of the present invention to provide a method for compressing an image from a one-chip color sensor by interpolating the luminance record in order to convert the color data into a form of luminance to color ratios such that errors generated by compression are not amplified by subsequent interpolation processes.

These and other objects of the present invention will become more apparent when taken in conjunction with the following description and drawings wherein like characters indicate like parts and which drawings form a part of the present disclosure.

DESCRIPTION OF THE PREFERRED EMBODIMENTS OF THE INVENTION

Figure 1:
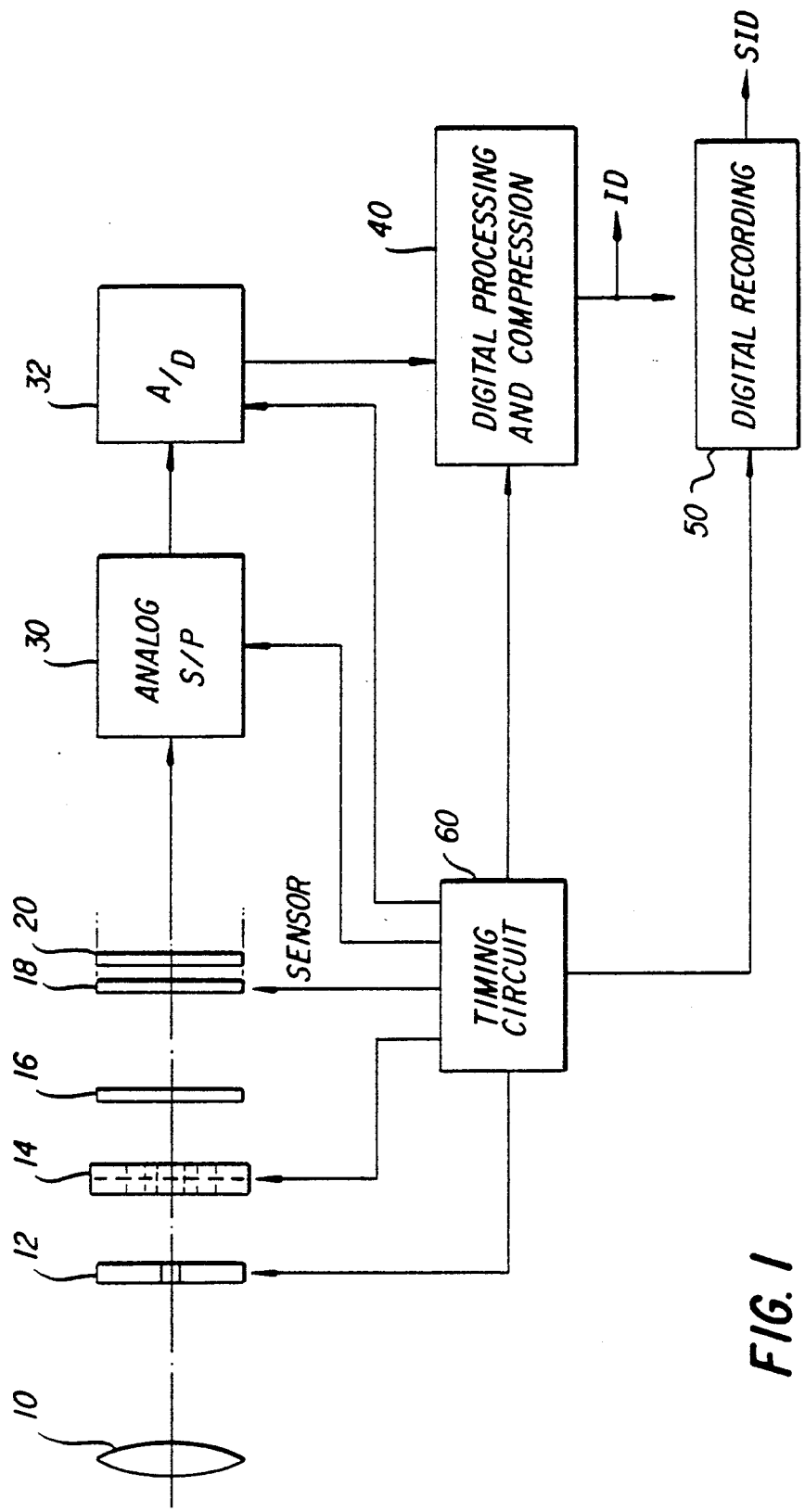
FIG. 1 is a schematic block diagram of an electronic camera incorporating the present invention.

FIG. 1 illustrates a block diagram of a digital electronic camera. The image of a scene (not shown) is focused onto an image sensor 20 by a camera lens 10. The image sensor 20 is composed of a number of discrete sensor elements 20A or pixels arranged in a two-dimensional array to form individual photosites (see FIG. 3). The individual photosites are covered with a regular array of color filters 18. The image sensing elements 20A respond to the appropriately colored incident illumination to provide an analog electronic signal corresponding to the intensity of the illumination incident on the sensor elements. This invention is described in relation to a charge coupled device (CCD) sensor having 1280 horizontal columns and 1024 vertical rows of pixels although other types of image sensors and sensors with other dimensionalities may be used.

A lens aperture 12 and shutter 14 are interposed between the lens and image sensor 20 in order to provide the proper sensor illumination level for a variety of scene light levels. A birefringent blur filter 16 is placed in front of the image sensor 20 in order to reduce color aliasing. The analog output signal from the image sensor 20 is processed by an analog signal processor 30 incorporating, for example, a pre-amplifier and a correlated double sampling circuit which provides a low noise video signal and which uses circuits which are well known in the art. The output of the analog signal processor 30 is converted from analog form to digital form in an A/D converter 32. The A/D converter 32 provides an 8 bit data signal for each sample.

The digitized color image is processed and compressed in block 40. The compressed digital image data ID from block 40 is recorded in the digital recorder block 50 and is available at its output as stored image data SID. The digital recorder can use any of the various digital recording techniques which are well known in the art, for example digital magnetic tape, digital magnetic disk, optical disk, or solid-state memory cards. A timing and control circuit 60 controls the various camera components in order to capture and store an image in response to the pressing of a camera exposure button (not shown).

Figure 2:
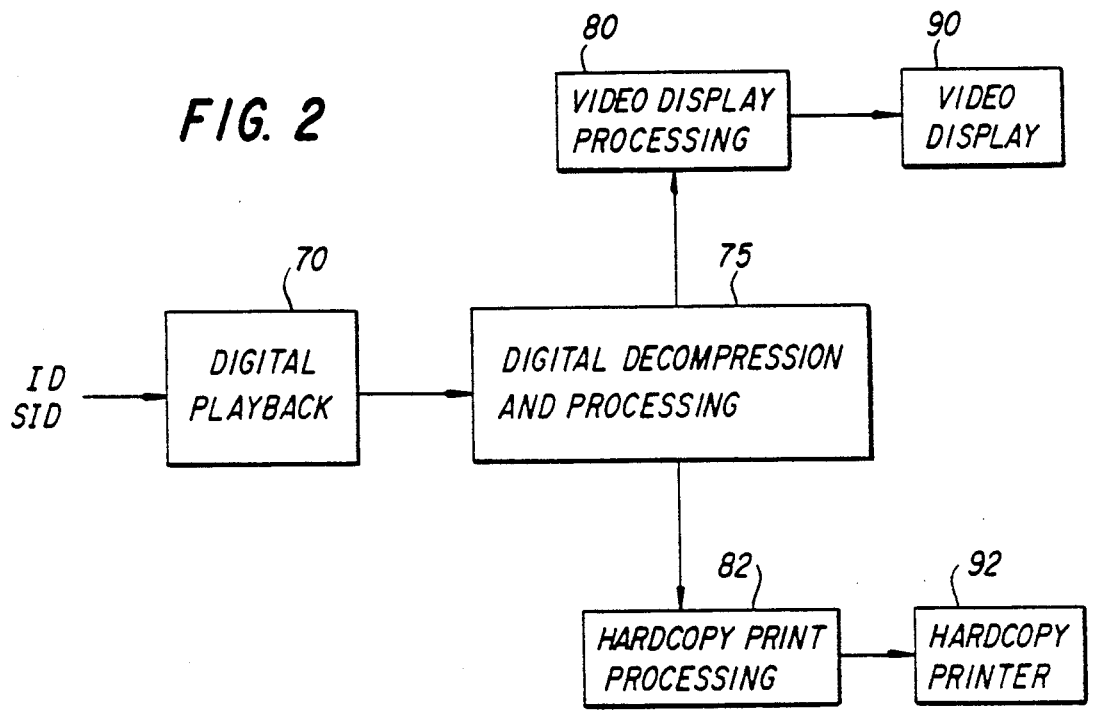
FIG. 2 is a schematic block diagram of a playback device that may be used to view images from the electronic camera of FIG. 1.

Referring now to FIG. 2, there is shown a schematic block diagram of a device used to display or print images recorded in the electronic camera of FIG. 1. A digital playback device 70 allows the stored digital image data SID recorded in the digital recording block 50 of FIG. 1 to be played back or to play the image data ID directly from the digital and compression block 40. A digital decompression and processing device 75 performs the inverse image compression and the signal processing in order to provide full resolution RGB data. A video display processing device 80 provides the specific signal processing needed for a particular video display 90, for example line rate conversion, video camera correction and NTSC encoding. A hardcopy print processing device 82 provides the specific signal processing needed for a particular hardcopy printer 92.

Figure 3:
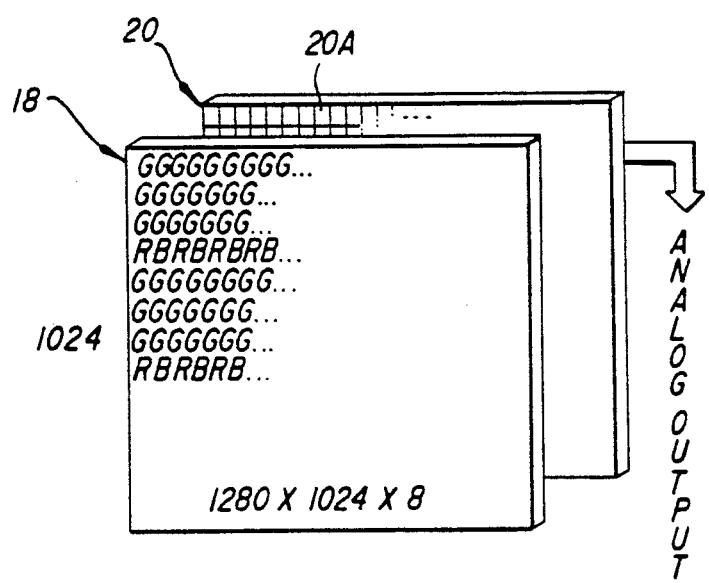
FIG. 3 illustrates a matrix of color image pixels formed with a color filter pattern of the type used in the electronic camera of FIG. 1.

Referring to FIG. 3, there is shown the color filter pattern 18 incorporated in FIG. 1 overlaying the image sensor 20 and the discrete sensing elements 20A. The 3G (green) CFA (color filter array) is a 1280×1024 pixel pattern of G(green), R(red), and B(blue) pixels with three quarter G pixels, one eighth R pixels and one eighth B pixels. The CFA pattern shown in FIG. 3 and the blur filter 16 shown in FIG. 1 are designed according to the teachings of U.S. Pat. No. 4,663,661 by J. Weldy et al, entitled "Single Sensor Color Video Camera With Blurring Filter" which patent is also assigned to Eastman Kodak Co. A higher proportion of G pixels relative to R and B is used to improve the luminance resolution of the image.

The G pixels are arranged in horizontal stripes to reduce rise-time artifacts, according to the teachings of U.S. patent application Ser. No. 208,302 entitled, "Color Imaging Apparatus Employing a Horizontal Stripe Color Filter to Reduce Rise-Time Artifacts" filed June 17, 1988 by Kenneth A. Parulski, which application is assigned to Eastman Kodak Co.

Figure 4:
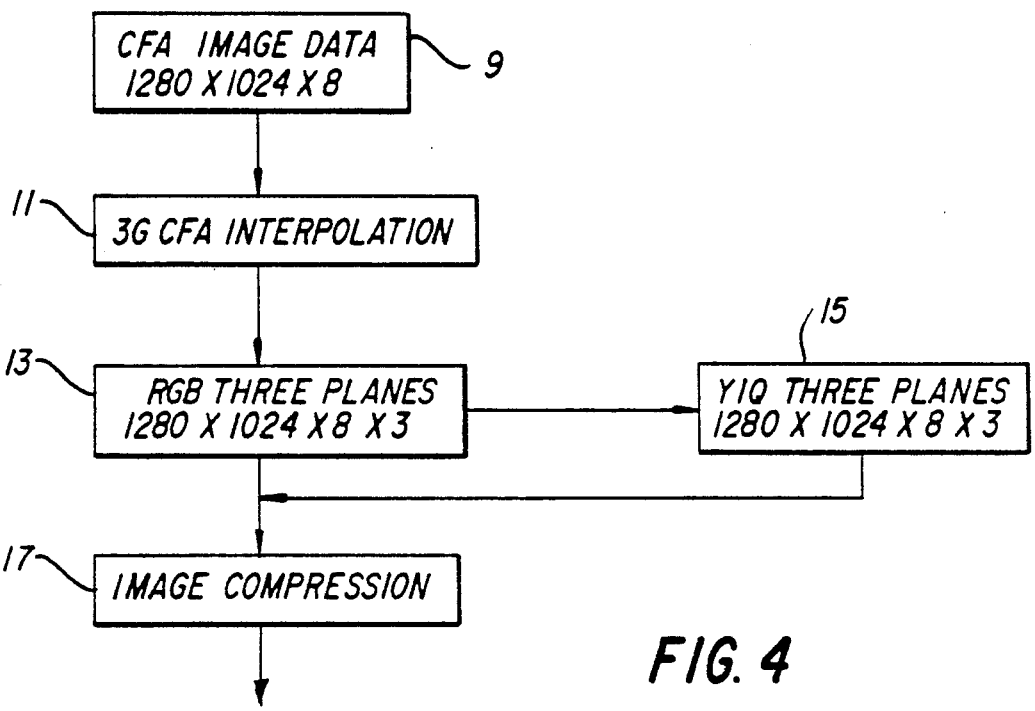
FIG. 4 is a prior art block flow diagram illustrating one conventional method for compressing a color image.

Referring to FIG. 4, a prior art block diagram of the digital processing and compression block 40 of FIG. 1 is shown implemented with a prior art compression method. Block 9 represents the CFA image data from the A/D converter 32 of FIG. 1, which consists of 1024×1280 or about 1.3 megabytes of data per image. A 3G CFA interpolation block 11 forms three full 1024×1280 planes of image data for RGB, or approximately 3.9 megabytes of data per image. Alternately, three planes Y, I and Q may be formed by directing the RGB image data of block 13 to block 15. Each of the formed YIQ planes is 1024×1280 pixels, the same size as the RGB image planes of block 13. Image compression is done directly on the three planes from either block 13 or block 15 in block 17. A system which incorporates an appropriate form of compression is shown in U.S. Pat. No. 4,797,729 entitled "Systems Incorporating An Error Tolerant Picture Compression Algorithm" by Y. T. Tsai.

After compression the total amount of data is substantially reduced. The compressed data may then be stored in the digital recording block 50 of FIG. 1 (or alternately may be transmitted). When played back (or received) an inverse compression operation is performed as reflected by block 75 of FIG. 2.

The inverse compression reconstructs the color image which can then be used either for further processing, video display, or printing.

When using the block flow of FIG. 4, three times the "raw" sensor data, or 3.9 megabytes, is processed by the image compression block 17. Consequently, the required buffer storage space is increased and the processing time is lengthened. These two drawbacks are especially significant when the system is implemented in a real-time application.

A key question is how the compression can be implemented on the "raw" sensor data so that the amount of data processed is not increased. Since the CFA introduces a color pattern into the image data, the correlation among the adjacent pixel values varies depending on the color they represent. If the image compression algorithm treats the "raw" sensor data as luminance data, then it is a very "busy" image which needs a high bit rate to represent it with visually lossless quality following color interpolation. Therefore, unless the "raw" sensor data is sorted out by color the CFA image compression will not be efficient. Furthermore, a single error in the uninterpolated image may cause a large error for more than a single pixel in the final interpolated image. Thus, it has been concluded that a compression algorithm with good performance on conventional color interpolated images cannot retain its performance when it is applied directly to uninterpolated image data from a single chip color sensor.

Figure 5:
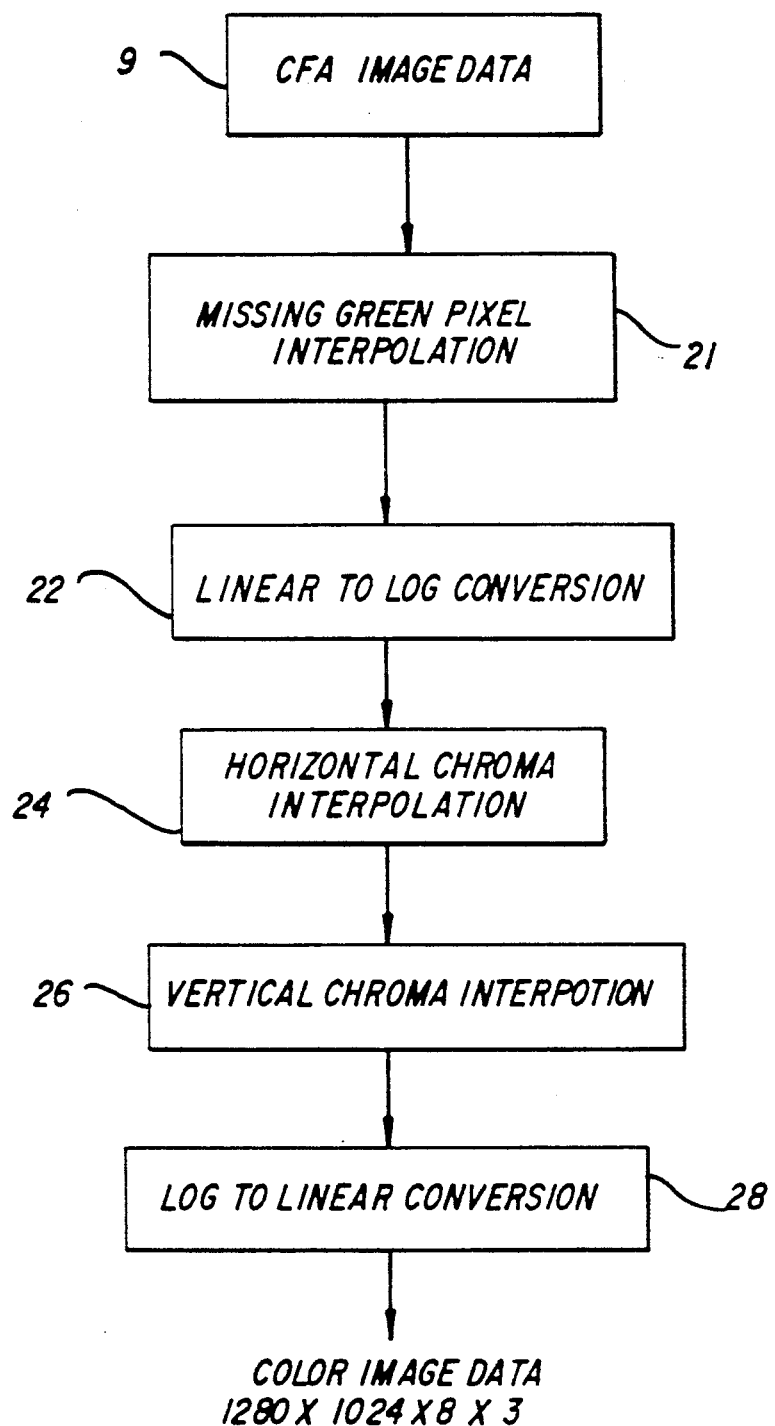
FIG. 5 is a block flow diagram illustrating a color filter interpolation method.

In order to fully appreciate the data rearrangements used in the compression methods to be discussed, a flow chart of the 3G CFA interpolation block 11 of FIG. 4 is shown in FIG. 5. Color edge artifacts (color aliasing) at luminance edges are minimized by interpolating the color signal (red and blue) to luminance (green) signal ratios instead of linearly interpolating the red and blue signals.

The missing green pixels are interpolated through the following equation in block 21:

$$CFA: \quad G_1$$
$$G_2$$
$$G_3$$
$$G_{Miss} = \text{Missing Green Pixel}$$
$$G_4$$
$$G_5$$
$$G_6$$
$$\text{Where,} \quad G_{Miss} = 0.218 (G_1 + G_6) - 0.563 (G_2 + G_5) + 0.844 (G_3 + G_4)$$

The filter coefficients are selected so that the effective PSF (point spread function) of the interpolated green pixels is equal to the PSF of the actual green pixels. For simple implementations, these filter coefficients can be approximated.

A linear-to-log conversion is performed in block 22 and the red channel horizontal chroma interpolation is performed by block 24 using:

$$CFA: \quad R_1 \; R_{miss} \; R_2$$
$$\text{where,} \quad R_{miss} = \text{Missing horizontal red pixels}$$
$$\log(R_{miss}) = \log(G_{R\;miss}) + 0.5*\{(\log R_1 - \log G_1) + (\log R_2 - \log G_2)\}$$

The red channel vertical chroma interpolation equations are processed in block 26 as follows:

$$CFA: \quad R_1$$
$$R_{miss1}$$
$$R_{miss2}$$
$$R_{miss3}$$
$$R_2$$
$$\text{where,} \quad \log R_{miss1} = \log(G_{Rmiss1}) + 0.75 \log (R_1/G_1) + 0.25 \log (R_2/G_2)$$
$$\log R_{miss2} = \log(G_{Rmiss2}) + 0.5 \log (R_1/G_1) + 0.5 \log (R_2/G_2)$$
$$\log R_{miss3} = \log (G_{Rmiss3}) + 0.25 \log (R_1/G_1) + 0.75 \log (R_2/G_2)$$

Where $G_{Rmissi}$'s are the actual green pixel values at the missing red pixels, and $G_1$ and $G_2$ are the interpolated missing green values at the red and blue photosites.

A log-to-linear process is applied to the signals from block 26 by the action of block 28.

The blue channel processing uses the same method steps as the red channel which are represented by the block flow of FIG. 5.

The chroma interpolation (blocks 24 and 26) typically uses a linear interpolation of the ($\log R - \log G_{miss}$) and (log B−log $G_{miss}$) values, which is equivalent to linearly interpolating the log $R/G_{miss}$ and log $B/G_{miss}$ values.

Figure 6A:
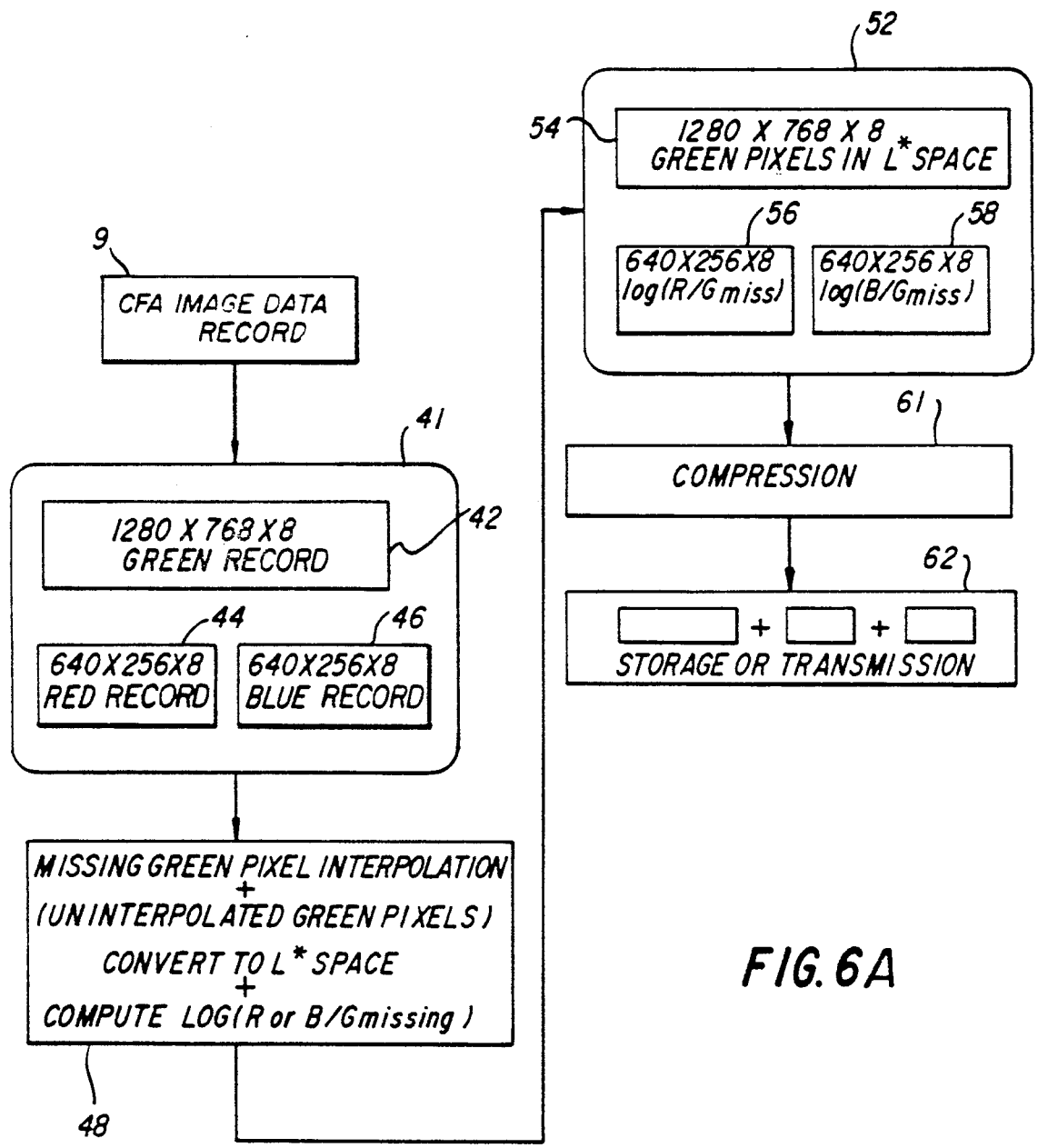
FIG. 6A is a block flow diagram illustrating the preferred embodiment of the camera processing and compression portion of the present invention.
Figure 6B:
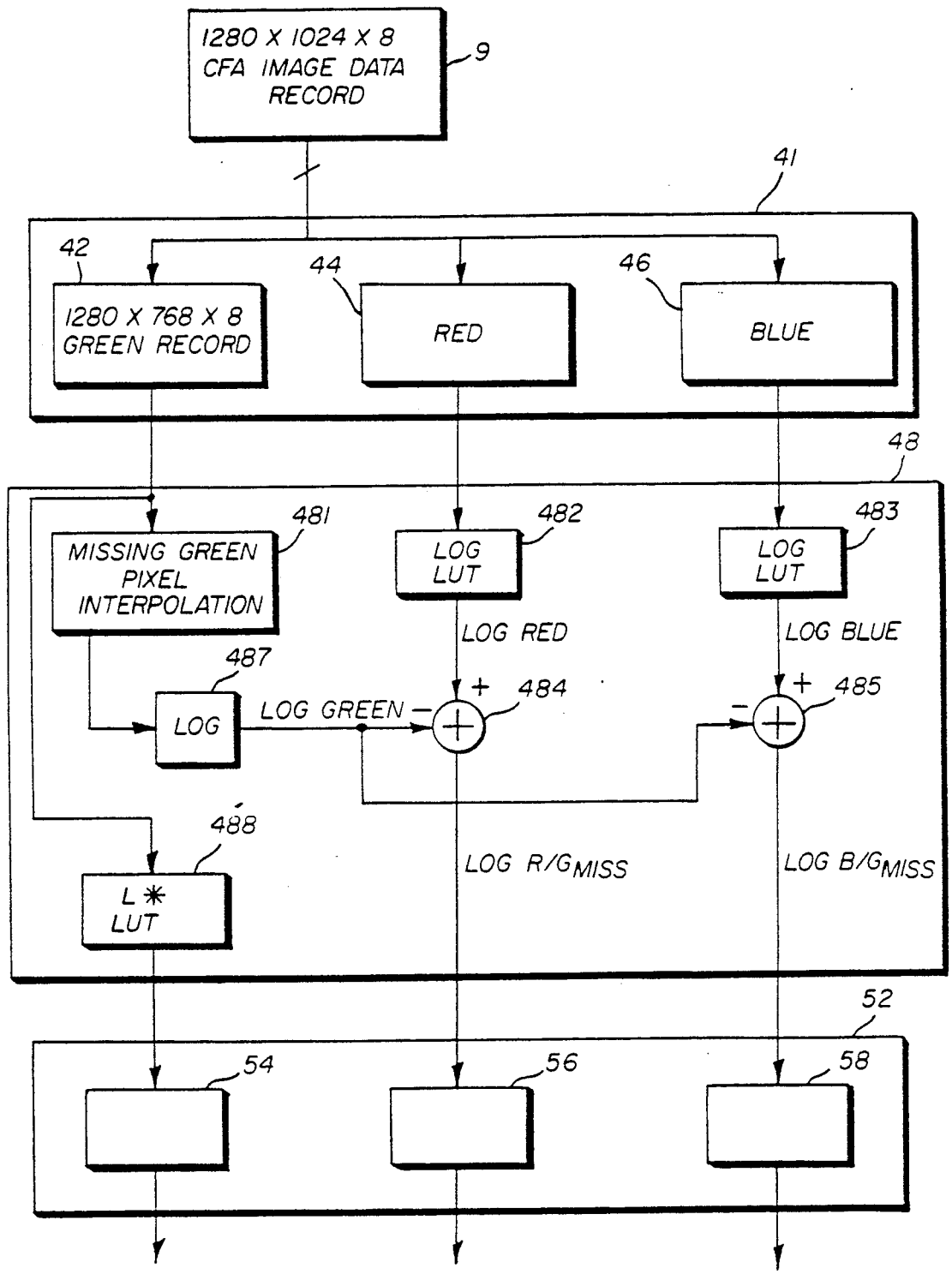
FIG. 6B is a more detailed block diagram representation of a number of blocks from FIG. 6A.
Figure 4:
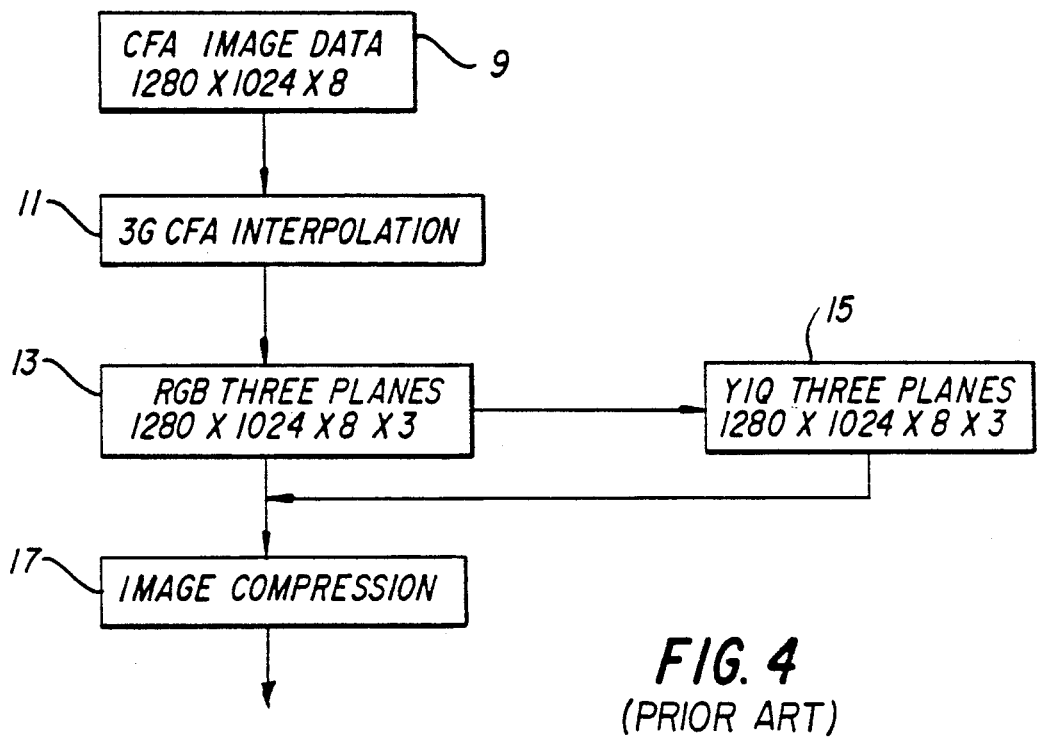
Figure 7:
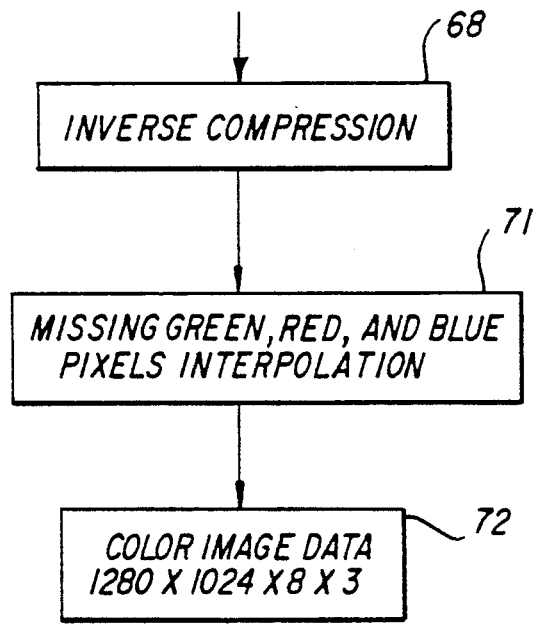

Refer now to FIG. 6A in conjunction with FIG. 6B which illustrates the digital processing and compression block 40 of FIG. 1 incorporating the preferred embodiment of the camera processing and compression portion of the invention. The input to block 41 is the digitized CFA image data record 9 from the A/D converter 32 in FIG. 1. CFA image data record 9 is a 1280×1024×8 bit array of data representing the linearly quantized color sensor data. The CFA image data record 9 is separated into three color data records 42, 44 and 46. Record 42 is a 1280×768×8 bit green array, record 44 is a 640×256×8 bit red array and record 46 is a 640×256×8 bit blue array (where 8 is the number of bits per pixel).

The green record 42 from block 41 is directed to block 48 wherein the missing green pixels ($G_{miss}$), that is the green values, at the red and blue photosites, are interpolated in block 481. Additionally, the log $R/G_{miss}$ and log $B/G_{miss}$ values are computed. This is accomplished using lookup tables 482 and 483 to perform the logarithmic conversion and a subtraction operation 484, 485 using the well-known equation, log $R/G_{miss}$=log R−log $G_{miss}$. The original (uninterpolated) green pixels are then converted via lookup table 488 to an L* space or another uniform intensity space, using the relationship L*=116 (Y/Yn) (⅓)−16 where: $Y_n$ is the value of Y for a reference white. The processing shown in FIG. 6 may be implemented in software in the digital processing portion of block 40.

Block 52 represents the three processed planes 54, 56 and 58 corresponding to the planes 42, 44 and 46. A compression operation 61 using, for example, an adaptive discrete cosine transform algorithm is separately performed on the three processed places from block 52. Once compressed the resulting signals may be stored (or transmitted) as reflected by block 62.

Figure 7:
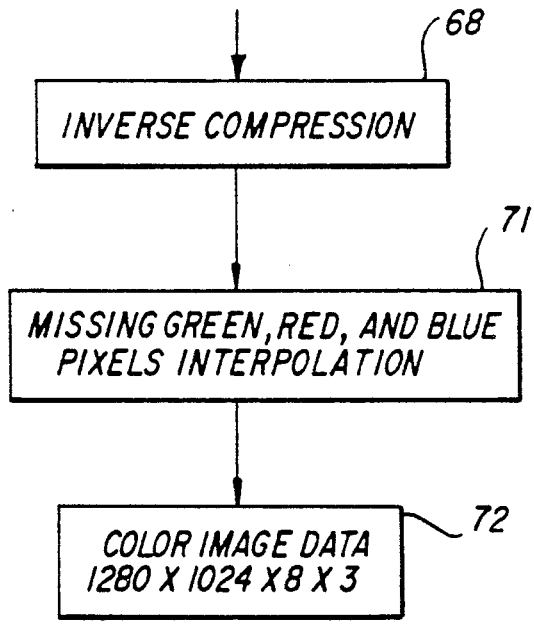
FIG. 7 is a block flow diagram illustrating the preferred embodiment of the playback decompression and processing method portion of the present invention.

At playback or upon receiving the transmitted, compressed image, the compressed signals are processed with the block steps as shown in FIG. 7. FIG. 7 represents the functions performed by block 75 of FIG. 2. Inverse compression is performed in block 68. The missing green, red and blue pixels are interpolated in block 71 which forms the color image data for the three planes as shown in block 72. The three planes from block 72 use approximately 3.9 Megabytes of data to represent an image.

In summary, missing green pixels are first interpolated so that log $B/G_{miss}$ and log $R/G_{miss}$ can be computed and the original uninterpolated green pixels are converted to L* space such that the noise sensitivity is distributed uniformly. Since chroma interpolation uses log R/G and log B/G, the compression on the chrominance information is preferrably done on this hue ratio so that the subsequent interpolation after playback does not introduce color artifacts. The implementation of the conversion to L* space can be done using a 256×8=2K bit lookup table. The log $R/G_{miss}$ or log $B/G_{miss}$ may be implemented using a 256×8K bits lookup table and one subtraction process (log A/B=log A−log B). The compression works on three separate files: the uninterpolated green pixels and two smaller size log $R/G_{miss}$ and log $B/G_{miss}$ files. In the playback process, the inverse compression is done first. Then the green pixels are converted from L* to linear space, interpolated, and converted to log space such that the missing red and blue pixel interpolation operation can be performed.

Figure 8:
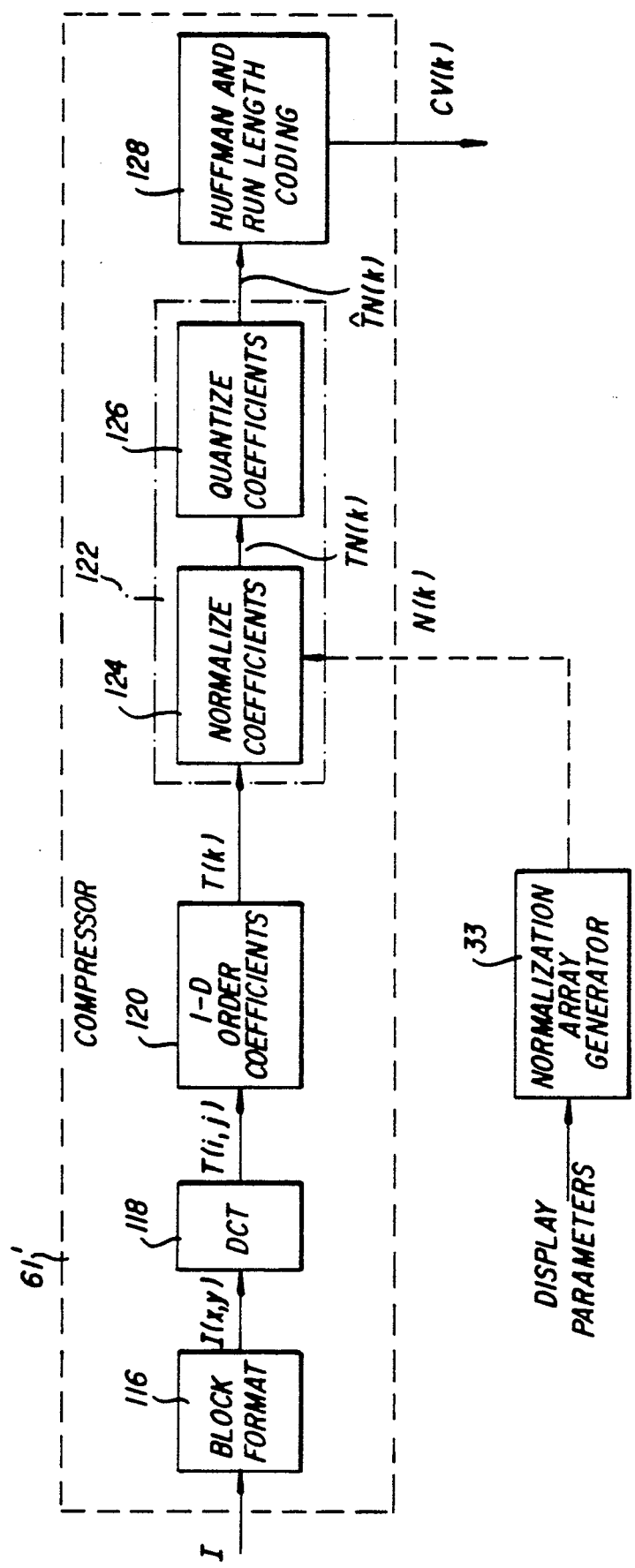
FIG. 8 is a block flow diagram of the preferred compression method portion of the present invention.

The hardware implementation for the compression function 61 is illustrated in FIG. 8.

The compressor 61' receives the three digital image input records "I" from block 52 of FIG. 6 at a block formatter 116 and formats the image into block I(x,y). The preferred block sizes are either 16×16 or 8×8 pixels. A two-dimensional discrete cosine transform is performed by the DCT 118 on each block to generate the corresponding block T(i,j) of transform (2−D DCT) coefficients. Since the 2−D DCT is a well known procedure, (see for example U.S. Pat. No. 4,302,775) no further description will be given herein of the (2−D DCT) operation. The transform coefficients T(i,j) for each block are ordered into a one-dimensional array T(k) by an order coefficients device 120 in order of increasing spatial frequency, for example by employing a zig-zag scan along diagonals of the block of coefficients.

Next, the coefficients are adaptively quantized using an adaptive quantizer 122 in accordance with the visibility of quantization noise in the presence of image detail within a block. According to the preferred mode of practicing the invention, the adaptive quantization 122 is comprised of a normalize coefficients section 124, the output of which is directed to a quantize coefficients section 126 for accomplishing a variable normalization 124 prior to a fixed quantization 126. Alternatively, a variable quantization could be employed. The transform coefficients T(k) are normalized by dividing each transform coefficient by a normalization factor N(k) as follows:

$$TN(k) = T(k)/N(k)$$

where TN(k) is the normalized transform coefficient value. The normalization factor N(k) is provided by a normalization array generator 33 receiving as an input display parameters. This is based on the visibility of quantization noise in the presence of image detail in the block. The normalized coefficients TN(k) are quantized in block 126 to form quantized coefficients TN(k). The quantized coefficients from 126 are encoded in a Huffman and run-length coding section 128 using a minimum redundancy coding scheme to produce code values CV(k). The presently preferred coding scheme is a Huffman code with run-length coding for strings of zero magnitude coefficients. Since Huffman and run-length coding are well known in the art, no further description of the coding process will be given herein. The coded coefficients are directed to and recorded by the digital recording block 50 of the electronic camera of FIG. 1.

Figure 9:
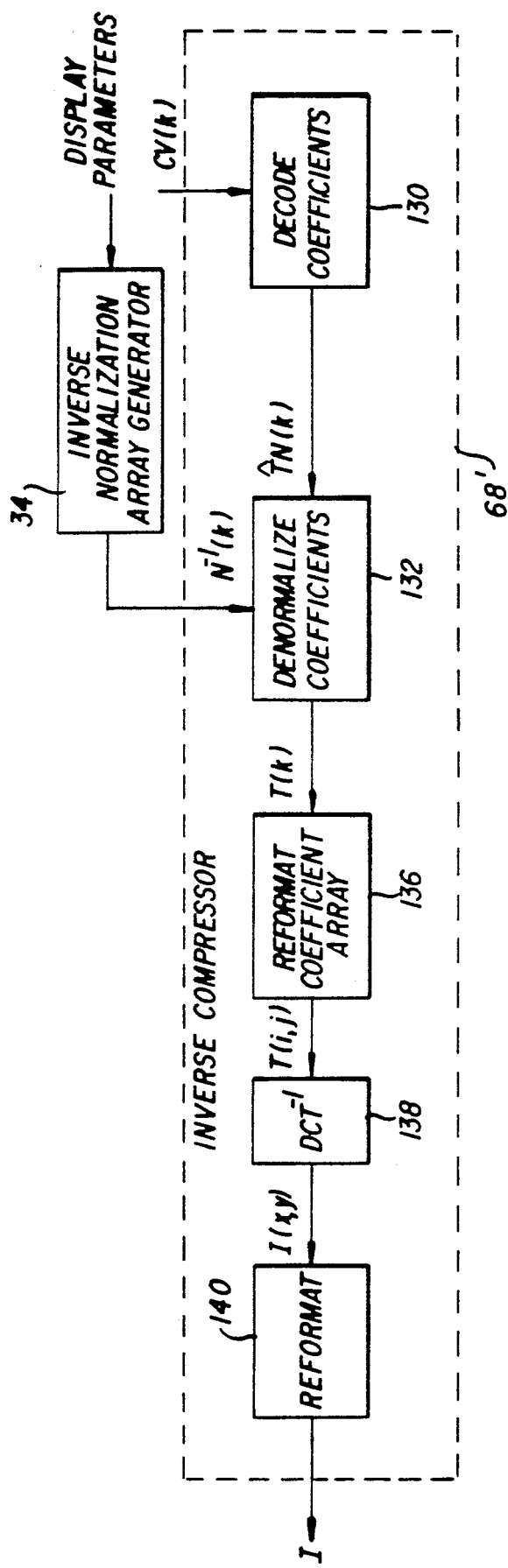
FIG. 9 is a block flow diagram of the preferred decompression method portion of the present invention.

Referring to FIG. 9, the inverse compressor 68', performs the inverse of the compression function performed by the compressor 61' in FIG. 8 to recover the digital image data. The code values CV(k) are directed to the input of a decode coefficients block 130 to produce normalized coefficients TN(k). The normalized coefficients TN(k) are denormalized in block 132 by dividing by the denormalization values $N^{-1}(k)$ that are the inverse of the normalization array N(k) employed in the transmitter to produce the denormalized coefficients T(k). Alternatively, the transform coefficients are denormalized by multiploying by the normalization coefficients N(k). An inverse normalization array generator 34 provides the signal $N^{-1}(k)$.

The one-dimensional string of reconstructed coefficient values T(k) are re-formated in block 136 into two-dimensional signal block T(i,j) and the blocks of coefficients are inversely transformed in block $DCT^{-1}$ 138 into image values I(x,y). Finally, the block of image values are re-formated in block 140 into the digital image I.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

We claim:

1. A color image compression apparatus for compressing a color pixel pattern comprising:
    forming means for forming said color pixel pattern into three color planes of red (R), green (G), and blue (B) pixels;
    interpolating means coupled to said forming means for interpolating missing green pixels from the color plane of green pixels;
    processing means for computing the Log R/G and Log B/G using the interpolated green pixels from said interpolation means;
    converting means for converting the uninterpolated green pixels from said forming means to an intensity uniform space; and
    compressing means for compressing the signals from said converting means and said processing means to provide a compressed color image.

2. The color image compression system according to claim 1 wherein said converting means is an L* space converter.

3. The color image compression system according to claim 1 wherein said processing means is comprised of a lookup table of Log B and Log G pixel values coupled to a subtractor such that the values of Log R/G and Log B/G are computed by subtracting the log value of G from the log value of R and G.

4. The color image compression system according to claim 1 wherein said compressing means uses a discrete cosine transform based algorithm.

5. A color image compressing method comprising the steps of:
    a. separating a multicolor image into at least three single color records;
    b. interpolating luminance signal values at each spatial location and corresponding to the red and blue pixel locations;
    c. transforming at least one record to a space perceptually uniform metric;
    d. converting two of the remaining records into two color ratios which are a function of the interpolated luminance signal value at the spatial locations corresponding to the red and blue pixels;
    e. compressing individually the transformed record and said two color ratios;
    f. transmitting said compressed record and said two color ratios;
    g. receiving the compressed record and said two color ratios;
    h. interpolating the received compressed record and said two color ratios to form three color planes of image data; and
    i. combining and displaying said three color planes of image data to form a multicolor image.

6. The color image compression method according to claim 5 wherein said multicolor image is separated into green, red and blue records.

7. The color image compression method according to claim 6 wherein said green record is transformed to a space perceptually uniform metric.

8. The color image compression method according to claim 7 wherein said two color ratios are Log $R/B_{miss}$ and Log $B/G_{miss}$.

9. The color image compression method according to claim 5 wherein the step of transmitting is deleted and a step of storing said compressed records substituted therefor.

10. A color image compression method comprising the steps of:
    a. converting a multicolor image into red, green and blue planes of pixel values;
    b. forming a set of luminance values for the green plane of pixel values;
    c. interpolating the missing green pixel values at each associated red and blue pixel value;
    d. forming a red color ratio for each red pixel value at a spatial locating as a function of an associated interpolated missing green pixel value;
    e. forming a blue color ratio for each blue pixel value at a spatial location as a function of an associated interpolated missing green pixel value;
    f. compressing said formed set of luminance values and said formed red and blue color ratios; and
    g. storing said compressed luminance values and said formed red and blue color ratios for future use.

11. The color image compression method according to claim 10 and further comprising the steps of:
    decompressing the compressed luminance values and said formed red and blue color ratios;
    interpolating the missing red, green and blue pixel values from said decompressed luminance values and said formed red and blue color ratios to form red, green and blue planes of pixel values; and
    displaying the combined red, green and blue planes of pixel values to reconstruct said multicolor image.

12. A color image compression method comprising the steps of:
    a. converting a multicolor image into planes of green, red and blue pixel values, each associated with a spatial location of said multicolor image;
    b. interpolating the missing green pixel values at each spatial location corresponding to a red and a blue pixel;
    c. forming a color ratio for each red pixel value to its associated missing green pixel value;
    d. forming a color ratio for each blue pixel value to its associated missing green pixel value;
    e. converting the uninterpolated green pixel values to a lightness space metric;
    f. compressing said formed lightness space metric and said formed color ratios; and
    g. storing said compressed formed lightness space metric and said formed color ratios for future use.

13. The color image compression method according to claim 12 wherein said lightness space metric is an L* space.

14. The color image compression method according to claim 12 wherein step g is deleted and the following steps added:
    h. transmitted said compressed formed lightness space metric and said formed color ratios;

i. receiving said compressed formed lightness space metric and said formed color ratios;
j. decompressing said compressed formed lightness space metric and said color ratios;
k. forming planes of red, green and blue pixel values from said decompressed lightness space metric and said color ratios;
l. combining said planes of red, green and blue pixel values to form a plane of red, green and blue pixel values; and
m. displaying said formed plane as a reconstructed multicolor image.

15. The color image compression method according to claim 12 wherein said color ratios are formed as the Log $R/G_{miss}$ value, and Log $B/G_{miss}$ value.

* * * * *